May 27, 1958
R. S. ELLIOTT
2,836,821
MECHANICAL PHASE SHIFTER
Filed Aug. 19, 1955
3 Sheets-Sheet 1
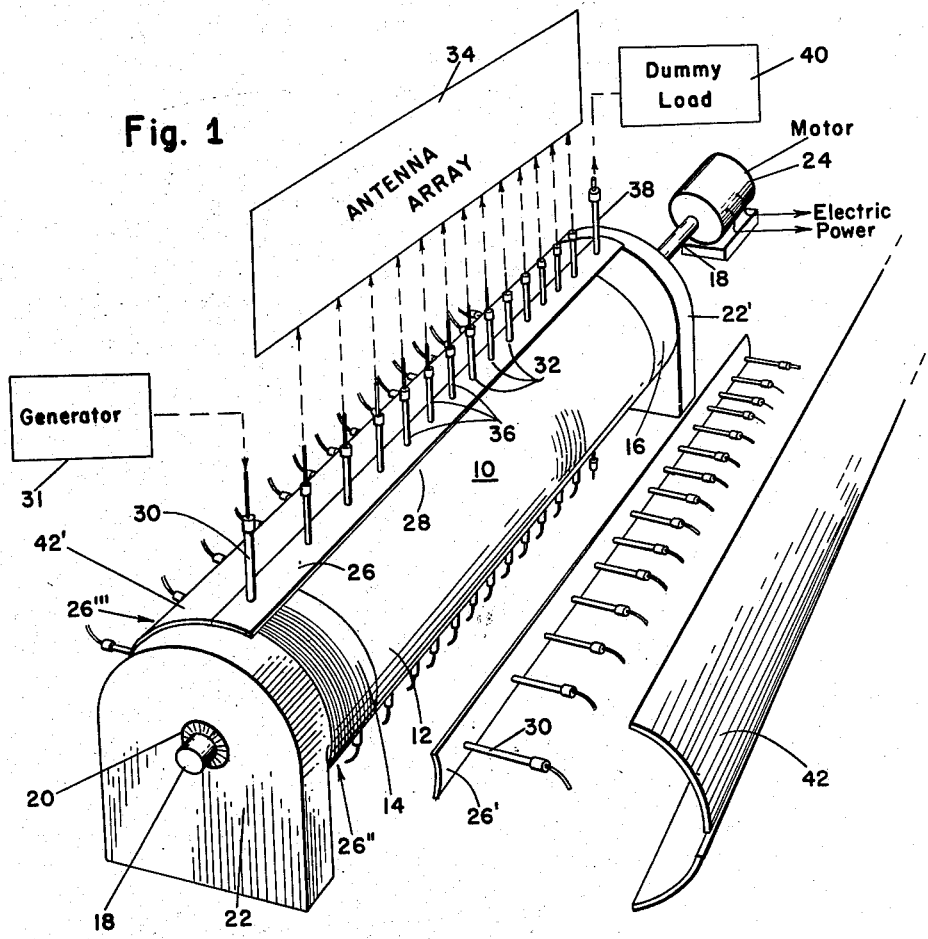
Fig. 1
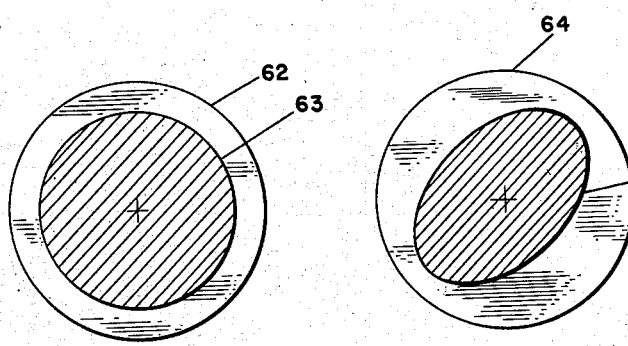
Fig. 3
Fig. 4
INVENTOR
Robert S. Elliott
BY
Henry Heyman
ATTORNEY May 27, 1958     R. S. ELLIOTT     2,836,821
MECHANICAL PHASE SHIFTER Filed Aug. 19, 1955     3 Sheets-Sheet 2

INVENTOR
Robert S. Elliott
BY
*Henry Heyman*
ATTORNEY

May 27, 1958  R. S. ELLIOTT  2,836,821
MECHANICAL PHASE SHIFTER
Filed Aug. 19, 1955  3 Sheets-Sheet 3
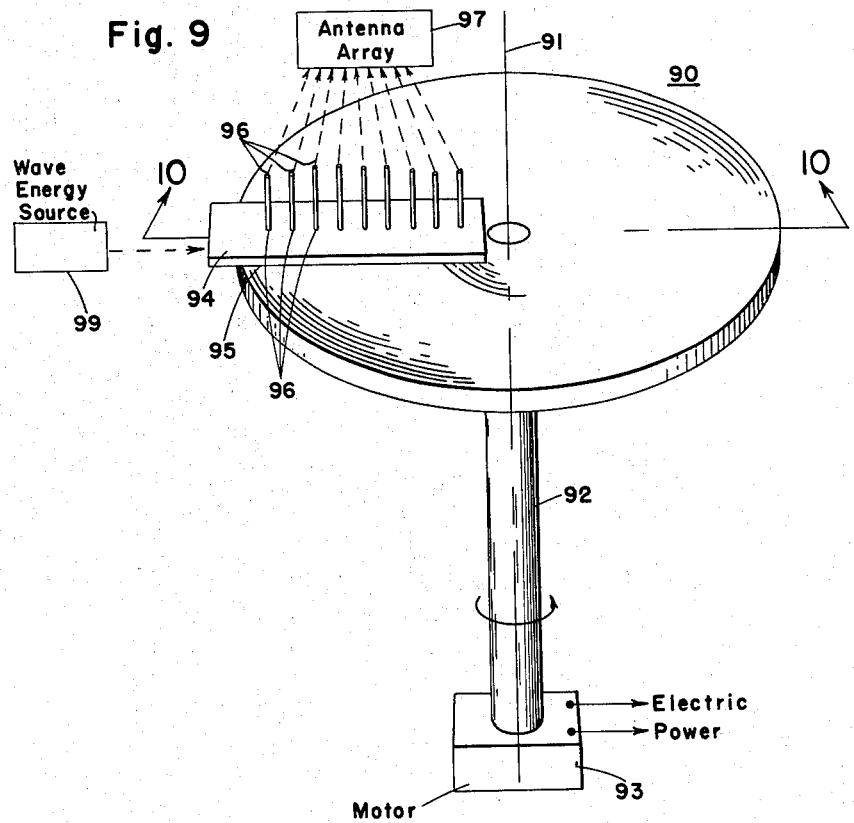
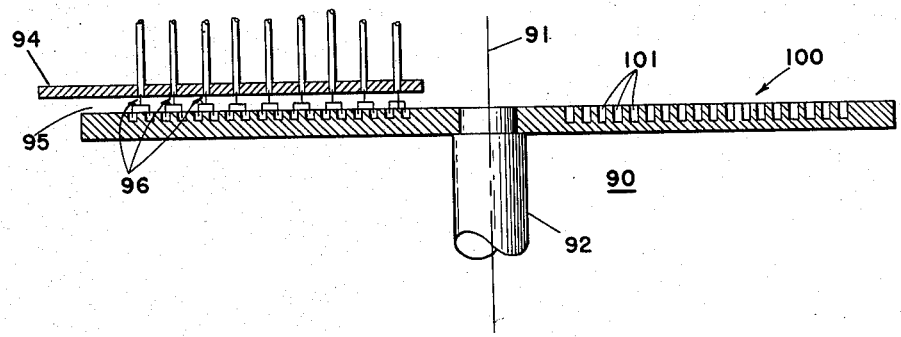
INVENTOR
Robert S. Elliott
BY
Henry Heyman
ATTORNEY

United States Patent Office 2,836,821
Patented May 27, 1958

2,836,821

MECHANICAL PHASE SHIFTER

Robert Stratman Elliott, Los Angeles, Calif., assignor to Hughes Aircraft Company, Culver City, Calif., a corporation of Delaware Application August 19, 1955, Serial No. 529,557

13 Claims. (Cl. 343—854)

This invention relates to scanning antenna arrays and particularly to mechanical phase shifters employed with scanning antenna arrays.

Corrugations in hollow waveguides and in parallel plate transmission lines have heretofore been successfully employed to decrease the velocity of electromagnetic waves propagated through such guides or lines. The effect of such corrugations, in general, is to decrease the phase velocity of the electromagnetic waves. The magnitude of the decrease depends on the depth of the corrugations, being a minimum for zero depth and a maximum for a depth corresponding to one-quarter of a wavelength. The decrease results from the inductive impedance which the corrugations present to the flow of electromagnetic energy. The range over which the velocity may be varied depends also on whether the corrugations are in hollow waveguides or in parallel plate transmission lines.

In hollow waveguides the phase velocity of electromagnetic wave energy propagated therethrough depends on the dimensions of the guide in the direction transverse to the direction of propagation and the E-field vector. By increasing this dimension, the phase velocity of the electromagnetic energy may be decreased from a theoretical value of infinity to that of the velocity of light. In parallel plate transmission lines the phase velocity of electromagnetic energy propagated in the TEM mode between the plates depends on the dielectric constant of the material between the plates and equals the velocity of light when this material is air. By increasing the dielectric constant, the phase velocity of the electromagnetic wave energy may be decreased from a theoretical value of the velocity of light to a value of zero.

Instead of physically changing the dimensions of the guide or the dielectric constant of the parallel plate transmission line, the corrugations may accomplish an equivalent result by the phenomenon of compressing or capturing the wave, the degree of compression or capture depending on the depth of the corugations. This depth range, for all practical purposes, ranges from zero to the value of one-quarter of a wavelength. Increasing the depth beyond this range will result in a reduction of the corrugation effect.

Several phase shifters used as array feeds employing corrugations of variable depth are known in the prior art. However, the devices heretofore employed have primarily utilized hollow waveguides which required great physical length and which have a small power handling capacity. Corrugations in hollow waveguides are only capable of decreasing the phase velocity of the electromagnetic energy to the free space velocity of electromagnetic waves so that great physical length is required for a sizable phase shift. The use of an adjustable corrugation depth necessarily introduces an air gap into the guide wall, thereby impeding the current flow in the guide wall. The air gap limits the power handling capacity of the waveguide, so that mechanical control of the phase of the electromagnetic energy is obtained only at the expense of the power handling capacity.

It is therefore an object of this invention to provide an improved feed and phase shifter having a large power handling capacity and a mechanically variable phase control.

It is a further object of this invention to provide an improved feed and phase shifter having corrugations, the depths of which are mechanically variable, and along which a distance corresponding to 180 electrical degrees is physically less than one-half of the free space wavelength of the energy so propagated.

It is a still further object of this invention to provide a feed and phase shifter which has a large power handling capacity, a small physical length, and whose phase may be varied in a cyclic fashion.

It is a still further object of this invention to provide a feed for an antenna array which may selectively control the phase of the energy propagated by the feed.

In accordance with this invention, electromagnetic wave energy may be propagated through a parallel plate type of transmission line. The interior face of one of the plates may include corrugations spaced parallel to one another and perpendicular to the direction of propagation of the wave energy. The depth of the grooves may be continuously variable between two predetermined values. Wave energy traveling along this transmission line will be subjected to a variation in phase which corresponds to the depth of the grooves.

A set of pick-off probes may be inserted in the space between the two plates of the transmission line. The pick-off probes extract predetermined amounts of wave energy from the transmission line and convey the energy so extracted to radiation apertures forming an antenna array. In one form, the probes are equidistantly aligned along the direction of propagation of the wave energy and each probe is coupled to the transmission line and a different radiator. The physical distances between adjacent probes depend on the average depth of the grooves and the desired electrical separation between adjacent radiation apertures of the array.

The corrugated plate of the parallel plate type transmission line may be a portion of a cylindrical drum having annular grooves whose depth changes along their length and is a function of the angular position of the drum. The corrugated plate may also be a portion of a disc with concentric grooves in one of its surfaces whose depth changes along their length and is a function of the angular position of the disc. Rotation of the drum or disc changes the depth of the corrugations to vary the phase of the energy provided to the radiators.

Fig. 1 is a perspective view of an embodiment in accordance with this invention, showing the front cover of a corrugated drum and one of four line strips in exploded view.

Fig. 3 is a cross-sectional view of an end portion of the corrugated drum, taken along line 3—3 of Fig. 2 and showing the profile of the corrugation grooves.

Figs. 4, 5 and 6 are cross-sectional views of the center portion of the corrugated drum, taken along line 4—4 of Fig. 2 and showing alternate profiles or embodiments illustrating the relationship between the depth of the corrugation grooves and the angular position of the drum portion.

Figs. 9 and 10 are perspective and plane views respectively of another embodiment of this invention.

Figure 5:
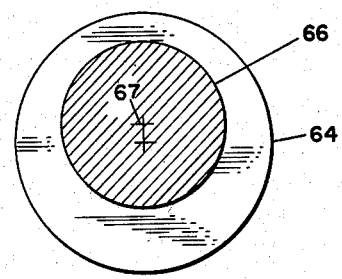

Referring now particularly to Fig. 1 of the drawings, there is shown a conductive corrugated cylindrical drum 10 comprising three portions, namely, a center portion 12 which is rotatably mounted and two end portions 14 and 16 which are rigidly mounted. The center portion 12 of the corrugated drum 10 is rigidly mounted on a shaft 18, coaxial with the drum 10, which passes through clearance holes cut into the end portions 14 and 16 to a pair of support bearings 20 and 20′ seated in a pair of end supports 22 and 22′, respectively. Further particulars of the corrugated drum 10 will be described in conjunction with Fig. 2. The axial shaft 18 extends through the support 22′ and is connected to an electric motor 24. In this way, the motor 24, upon being energized, will continuously rotate the center portion 12 of the corrugated drum 10. The end portions 14 and 14′ of the corrugated drum 10 are rigidly attached to the end supports 22 and 22′, respectively.

A conductive strip 26 having a somewhat curved cross section, the center of curvature of which lies along the drum 10 axis, is placed longitudinally adjacent and in close parallel proximity with the drum surface and supported at its ends by the supports 22 and 22′. The inner surface of the strip 26 and the opposed coextensive section of the outer surface of the drum 10 thereby form a parallel plate type of transmission line 28. The space between a portion of the outside of the drum 10 and the inside of the strip 26 corresponds to the separation space between two parallel plates forming a parallel plate transmission line.

A coaxial transmission line 30 provides the power input to the transmission line 28, one end being coupled to a wave energy source, such as a generator 31. Its position along the transmission line 28 is such that it launches wave energy one-quarter of the working wavelength distance from the extremity of the end portion 14 which corresponds to the inner edge of the support 22. In this way the wave energy so launched sees an open circuit in the direction of propagation towards the support 22. The method of connecting the coaxial transmission line 30 to the transmission line 28 is shown and described in detail with respect to Fig. 7.

Figure 2:
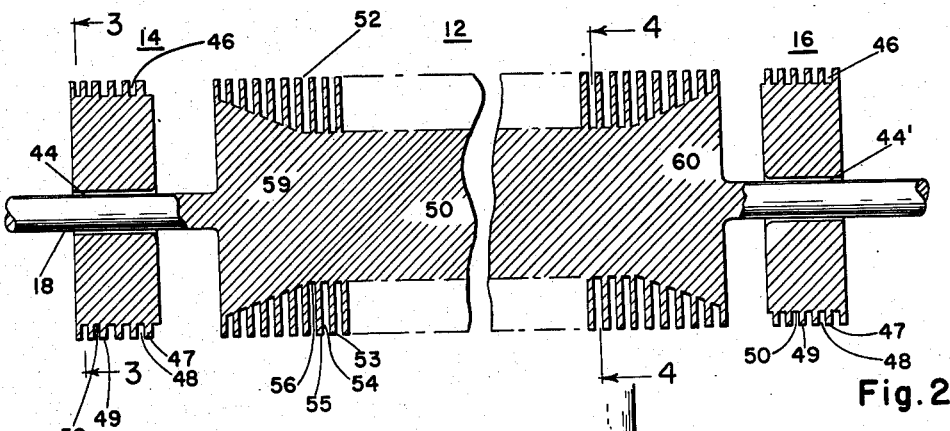
Fig. 2 is a cross-sectional view in elevation showing the details of the corrugated drum of Fig. 1.

The conductive strip 26 is also provided with a number of identical coaxial pick-off probes 32 placed longitudinally and equidistant from one another and which occupy the section of the transmission line 28 coextensive with the effective section of the center portion 12 as described with respect to Fig. 2. The purpose of the pick-off probes 32 is to extract energy from the transmission line 28 and convey it to an antenna array 30 via coaxial transmission lines 36 of which the probes 26 form an end portion. The method of connecting the probes 32 to the transmission line 28 is described in Fig. 8. A coaxial transmission line 38 serving as a termination is coupled to the transmission line 28 symmetrically opposite to the coaxial transmission line 30. The function of the coaxial transmission line 38 is to absorb all the wave energy not conveyed to the antenna array 34 and convey the same to a dummy load 40. A preferred way of placing the termination coaxial transmission line 38 is a quarter of the working wavelength away from the inner edge of the support 22′ so that a wave traveling in the direction of the support 22′ will see an open circuit at the position of the termination line 38.

Two dust covers 42 and 42′ are shown whose main function is to protect the corrugated drum. At the same time, however, they also act as electromagnetic shields and thereby convert the radiation leakage from the open transmission line to stored fields. The arrangement of Fig. 1 includes three additional conductive strips 26′, 26″ and 26‴ distributed adjacent to the drum 10 in 90-degree intervals and forming three additional transmission lines 28′, 28″, 28‴, one conductive strip 26′ being shown in an exploded view. The number of transmission lines that may be formed with a single drum depends only on the space limitations and the number of arrays to be fed. A single array is usually fed by a single transmission line, but may also be fed by two or more transmission lines of this invention, depending on the programming employed.

Fig. 2 is a cross-sectional view of the corrugated drum 10 of Fig. 1 with the end portions 14 and 16 laterally separated from the center portion 12. Even though it is not necessary for this invention that the end portions 14 and 16 be identical, they are shown to be such in the embodiment of Figs. 1 and 2. The center portion 12 is rigidly mounted on the shaft 18 and its surface is concentric therewith. One end of the shaft 18 passes through a first clearance hole 44 located in the end portion 14 and the other end passes through a second clearance hole 44′ located in the end portion 16. The end portions 14 and 16 each have an overall width which is greater than one-quarter of the working wavelength of the transmission line 28 and are provided with uniform annular surface corrugations 46 having a uniform depth.

The corrugations 46 in the end portions 14, 16 essentially comprise alternately a vane 47 and a groove 48, so that the depth of the corrugation is a measure of the depth of the groove. The outer surfaces of the end portions 14, 16 are therefore made up of the tops 49 of the vanes 47 and the bottoms 50 of the grooves 48.

The corrugations 52 in the surface of the center section 12 of the corrugated drum 10 differ from the corrugations 46 in the end portions 14, 16 in that the depths of the grooves 54 vary with the angular position of the center portion 12. The outside diameter of the center portion 12 is identical with that of the end portions so that the tops 55 of the vanes 53 remain unchanged.

The center portion 11 is essentially divided into three sections, a center section 58 and two transition sections 59 and 60 which are mirror images. The center section 58 of the center portion 12 has identical grooves 56 whose depths vary along the groove length as some function of the angular position of the center portion 12. The corrugations in the two transition sections 59, 60 of the center portion 12 provide a gradual stepwise change between the shape of the bottom 56 of the grooves 54 and the circular bottoms 50 of the grooves 48 in the end portions 14, 16. In other words, the changes from the constant depth of the grooves 48 in the end portion 14 to that of the varying depth of the groove 54 in the center portion 12 and then back again to the constant depth of the groove 48 of the end portion 16 are accomplished in gradual stepwise fashion by the transition sections 59 and 60. The reason for providing for these transition sections is to obtain a better impedance match for electromagnetic wave energy which is propagated longitudinally over the surface of the drum from one end to the other.

Fig. 3 is a cross-sectional view of an end portion 14 or 16 taken along the line 3—3. The outer circle 62 corresponds to the tops 49 of the vanes 47 of Fig. 2, being the outside diameter of the corrugated drum 10. The inner circle 63 corresponds to the bottom 50 of the groove 48 of Fig. 2. The radial distance between the circle 63 and the circle 62 is the depth of the corrugations 46 of the end portion 14 or 16.

Fig. 4 is a cross-sectional view of the center section 58 of the center portion 12 taken along the line 4—4. The outer circle 64 corresponds to the tops 55 of the vanes 53, being the outside diameter of the drum 10. The oval 65 corresponds to the bottom 56 of the grooves 54 of Fig. 2. The radial distance between the oval 65 and the circle 64 is the depth of the corrugations 52 which is seen to vary with the angular position of the radius vector.

Figure 6:
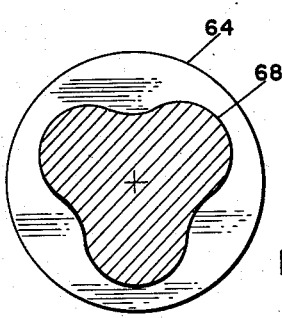

Figs. 5 and 6 are alternate embodiments of the center portion 12, showing the angular variation in depth of the grooves 54 along their length. In Fig. 5 the oval 65 of Fig. 4 is replaced with a circle 66 whose center 67 is displaced with respect to the axis of the corrugated drum 10. In Fig. 6, the oval 65 of Fig. 4 is replaced with the figure made by the line 68.

It is obvious at this point that an infinite number of variations of groove depth with angular position of the corrugated drum are possible. This variation may also be called the depth profile and depends entirely on the programming desired for the antenna beam, as is well known by those skilled in the art.

Figures 7, 8:
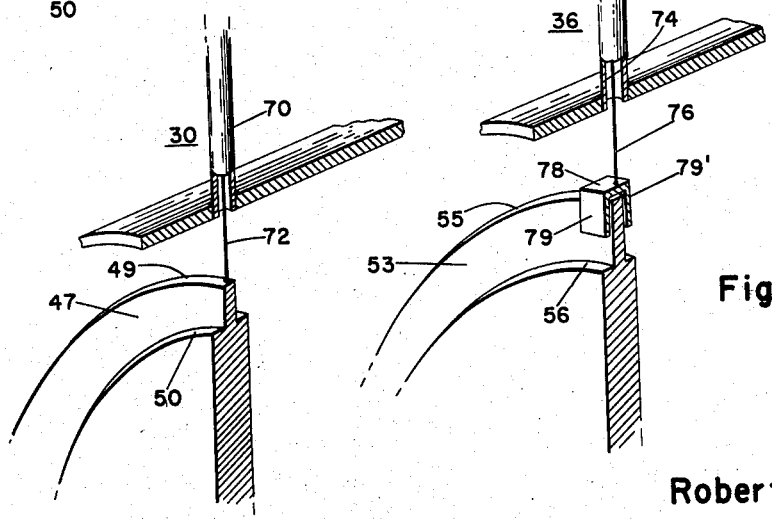
Figs. 7 and 8 are perspective views of methods of connecting coaxial lines to provide input and output connections.

Fig. 7 shows one coupling of the power input coaxial transmission line 30 to the transmission line 28 formed by the strip 26 and the corrugated drum 10. The coaxial transmission line 30 has an outer conductor 70 and an inner conductor 72. The outer conductor 70 is connected to the strip 26 and the inner conductor 72 is connected to the vane 47, preferably to the top 49 of the end portion 14. The termination coaxial transmission line 38 is coupled to the transmission line 28 in a similar manner, the outer conductor being connected to the strip 26 and the inner conductor being connected to the vane 47 of the end portion 16.

Fig. 8 shows one coupling of the coaxial transmission line 36 to the transmission line 26 by means of the pick-off probes 32. The coaxial transmission line 36 includes an outer conductor 74 and an inner conductor 76. The probe 32 may be the telescoped ends of the inner conductor 74 of the coaxial transmission line 36. The outer conductor 74 is physically connected to the conductive strip 26. The inner conductor 76 has a U-shaped bracket or clamp 78 rigidly attached to its extremity which sits astraddle the vane 53 of the center section 58 of the center portion 12. The bracket 78 actually comprises two capacitance plates 79, 79′ which effectively produce a capacitive electric coupling to the vane 53. In this way the vane 53 may be rotated for the purpose of providing varying depths of corrugations without changing the coupling existing between the vane 53 and the inner conductor 76 of the probe 32. This method of coupling the probes 32 to the transmission line 28 has the desirable features of eliminating physical contact between the inner conductor 76 and the drum portion 12.

The operation of this invention will now be explained. Electromagnetic wave energy from the power input coaxial 30 of Fig. 1 is fed to and propagated along the transmission line 28 formed by the conductive strip 26 and the surface of the corrugated drum 10. If the power input coaxial 30 is connected to the transmission line 28 approximately one-quarter of the working wavelength from the end support 22, the wave energy so launched will see an open circuit in the direction of end support 22 and be propagated entirely in the direction of end support 22′. As the wave energy proceeds toward the termination coaxial 38, it passes over the corrugations 46 in the end section 14 to the corrugations 52 in the center section 12. The corrugations are tapered from the uniform depth of grooves 48 of the stationary end portion 14 to the variable depth of the grooves 54 of the center portion 12. The transition sections 59 and 60 provide a smooth transition from the characteristic impedance of the constant depth corrugation 46 to the variable characteristic impedance of the variable depth corrugation 52. As the wave energy encounters the center section 58 of the center portion 12, energy is abstracted from the transmission line 28 by the pick-off probes 32 which occupy a region coextensive with the center section 58 and which act as coaxial transformers. Any wave energy remaining after passing the probes 32 is absorbed by the line termination coaxial 38 which conveys the remaining energy to a dummy load 40. The phase difference of the currents excited on successive probes 32 is constant for a given drum position, since successive probes are spaced equal distances apart. Wave energy is abstracted only from the center section 58 of the center portion 12, which section has a uniform cross section longitudinally. As the center portion 12 of the corrugated drum 10 is rotated, the wave energy propagated over it progressively encounters different depths of corrugations and consequently will be subjected to different amounts of phase shift. The phase difference, therefore, between any two pick-off probes will cyclically change depending on the rotational velocity of the center portion 12 and on the particular shape of the bottoms 56 of the groove 54. If the cross section of the center portion 12 corresponds to Fig. 4, the phase between successive probes will go through two periods when the drum goes through one revolution. For a cross section like the one shown in Figs. 5 and 6, the phase would go through one and three periods, respectively, upon one revolution of the drum 10.

The rapidity of the scan can be controlled in two ways, namely, by adjusting the angular velocity of the center portion 12 of the drum 10, or by changing the profile of the groove depth as was shown in Fig. 6. The scan angle and the angular acceleration of the scan beam are entirely a question of the profile of the groove depth.

Another arrangement in accordance with the invention is shown in Fig. 9. A conductive corrugated circular disc 90, rotatable about its axis 91 by means of a shaft 92, is connected to a motor 93. A conductive strip 94 is placed adjacent and in close parallel proximity with the corrugated surface of the disc 90. The space between the conductive strip 94 and the section of the disc 90, opposite to the conductive strip 94, forms a transmission line 95. A number of identical coaxial pick-off probes 96 are placed longitudinally and equidistant from one another into the transmission line 95. The probes 96 are connected to an antenna array 97 by the coaxial transmission lines 98. Wave energy may be applied to the transmission line 95 from a source 99.

Fig. 10 shows the disc 90 of Fig. 9 in greater detail as to the cross section. The corrugations 100 of the disc 90 comprise annular grooves 101 equidistant from one another and concentric with the axis 91 of the disc. The depths of the grooves 101 vary along their length, thereby establishing a depth profile similar to the depth profile of Figs. 4, 5 and 6. Rotation of the disc 90 will change the depth of corrugations of the transmission line 95 continuously, thereby providing a mechanical phase shifter. The probes 96 may be coupled to the transmission line 95 by means of the capacitive coupling shown in Fig. 8.

Although the invention has been explained in connection with certain embodiments, it should be understood that it is not to be limited to the embodiments described, inasmuch as other modification of parallel plate type of transmission line having corrugations of externally variable depth can be employed.

What is claimed is:

1. A parallel plate transmission line having a variable velocity of propagation comprising: an elongated electrically conductive strip and a conductive member movably mounted adjacent to said strip, said member having a surface, a portion of which is substantially parallel to and coextensive with said strip, said parallel and coextensive surface portion and said strip forming said parallel plate transmission line, said surface containing corrugations, the length of said corrugations contained within said parallel and coextensive surface portion being substantially perpendicular to the direction of elongation of said strip, the corrugation depth varying along the length of said corrugations in said surface continuously, whereby motion of said surface perpendicular to the direction of elongation of said strip changes the depth of corrugations contained within said parallel and coextensive surface portion, thereby varying the phase velocity along said transmission line between predetermined values which respective values are always less than the corresponding free space phase velocity.

2. A parallel plate wave energy transmission line having a variable velocity of propagation comprising: an elongated electrically conductive strip, said strip including a plurality of radiating portions; a conductive member movably mounted adjacent to said strip, said member having a surface, a portion of which is substantially parallel to and coextensive with said strip, said parallel and coextensive surface portion and said strip forming said transmission line, said surface containing corrugations, the length of said corrugations contained within said parallel and coextensive surface portion being substantially perpendicular to the direction of elongation of said strip, the corrugation depth varying along the length of said corrugations in said surface continuously; and means for applying wave energy to said transmission line, whereby motion of said surface perpendicular to the direction of elongation of said strip changes the depth of corrugations contained within said parallel and coextensive surface portion, thereby varying the phase velocity of said wave energy along said transmission line between predetermined values which respective values are less than the corresponding free space phase velocity.

3. A parallel plate wave energy transmission line having a variable velocity of propagation comprising: an elongated electrically conductive strip, said strip including a plurality of radiating portions arranged therein longitudinally and spaced at distances corresponding to predetermined equal spaced intervals of the wave energy in said transmission line; a conductive member movably mounted adjacent to said strip, said member having a surface, a portion of which is substantially parallel to and coextensive with said strip, said parallel and coextensive surface portion and said strip forming said transmission line, said surface containing a plurality of equispaced, endless corrugations, the length of said corrugations contained within said parallel and coextensive surface portion being substantially perpendicular to the direction of elongation of said strip, the corrugation depth varying along the length of said corrugations in said surface continuously; means for applying wave energy to said transmission line; and means for laterally moving said member perpendicular to the direction of elongation of said strip, whereby the depth of corrugations contained within said parallel and coextensive surface portion is varied thereby varying the phase velocity of said wave energy along said transmission line between predetermined values which respective values are less than the corresponding free space phase velocity.

4. An electromagnetic feed and phase shifting device for coupling an electromagnetic energy source to a plurality of radiators of an antenna array comprising: an elongated electrically conductive strip; an elongated electrically conductive member having surface depressions of varying depth therein normal to the direction of elongation of said member, said member being mounted substantially parallel to said strip and movable normal to the direction of elongation of said strip, said strip and said member forming a parallel plate transmission line; means coupling said parallel plate transmission line to said energy source to provide inputs to said line; and a plurality of probe members electrically coupled to said transmission line and each to a different radiator, said probe members being arranged longitudinally and at equal intervals along said tranmission line.

5. A system for propagating a beam of wave energy and for directing said beam through a predetermined angle, said system comprising: an elongated electrically conductive strip, said strip including a plurality of radiating portions for providing a beam of wave energy; a rotatable member adjacent said strip, said strip and said member forming a parallel plate transmission line, said member including a plurality of grooves, each in a different plane substantially perpendicular to the direction of elongation of said strip, the depth of said grooves being a function of the position on said member; and means for applying wave energy to said transmission line, whereby rotation of said member alters the phase of the wave energy between adjacent radiating portions in a predetermined manner and thereby directs said beam through a predetermined angle.

6. A wave energy transmission line having a variable velocity of propagation comprising: an elongated electrically conductive strip; a substantially cylindrical drum rotatable about its axis and adjacent said conductive strip, said strip and said drum forming the transmission line, said drum including a plurality of surface corrugations, each in a different plane substantially perpendicular to the axis of said drum, the radial depth of said corrugations being a predetermined function of the angular position on said drum; and means rotating said drum about its axis, whereby on rotating said drum with respect to said conductive strip the depth of corrugations adjacent said strip is altered, thereby changing the velocity of propagation of wave energy propagated along said transmission line.

7. A transmission line having a variable velocity of propagation comprising: an elongated electrically conductive strip; a substantially circular disc rotatable about its axis and adjacent said conductive strip, said strip and said disc forming said transmission line, said disc including a plurality of equispaced annular surface corrugations concentric with the axis of said disc, the depth of said corrugations being a predetermined function of the angular position on said disc; and means rotating said disc about its axis, whereby on rotating said disc with respect to said conductive strip the depth of corrugation adjacent said strip is altered, thereby changing the velocity of propagation of wave energy propagated along said transmission line.

8. An electromagnetic feed and phase shifting device for coupling an electromagnetic transceiver to a plurality of radiators of an antenna array comprising: a parallel plate transmission line for propagating electromagnetic energy, said transmission line having electrically conductive surfaces facing one another, one of said surfaces having corrugations substantially perpendicular to the direction of elongation of said transmission line, the depth of said corrugation changing in a predetermined manner along their length; a plurality of probes equispaced from one another in the direction of elongation of said transmission line and electrically coupled thereto and to said plurality of radiators, means for electrically coupling said transmission line to said transceiver, and means for moving one of said conductive surfaces with respect to the other to change the depth of said corrugations effectively contained within said transmission line, whereby the length of the electrical path between adjacent probes of said plurality of probes is varied to thereby vary the phase of the energy input into said plurality of radiators relative to each other.

9. An electromagnetic feed and phase shifting device for coupling an electromagnetic transceiver to a plurality of radiators of one or more antenna arrays comprising: at least one elongated electrically conductive strip; an elongated electrically conductive cylindrical drum, at least a portion of said drum being rotatably mounted, said drum and said strip being supported with the plane of elongation of said strips lying in the plane of the axis of said drum and with its periphery adjacent and parallel to said drum, said strip and said drum forming a transmission line; means for electrically coupling said transmission line proximate one end thereof to said transceiver; and a plurality of probes equispaced from each other in the direction of elongation of said drum and electrically coupled to said transmission line and to respective radiators, said cylindrical drum having a plurality of eccentric corrugations lying in planes normal to its axis, whereby rotation of said drum varies the length of the electrical path between said plurality of probes relative to each other to thereby vary the phase of the energy input into said plurality of radiators relative to each other.

10. An electromagnetic feed and phase shifting device for coupling an electromagnetic source to a plurality of radiators of one or more antenna arrays comprising: an elongated electrically conductive cylindrical drum, said drum including a rotatable center portion and two stationary end portions, the center portion of said drum having a plurality of identical annular corrugations lying in planes normal to the axis of the drum and varying in depth along their length, the end portions of said drum having a plurality of annular corrugations lying in planes normal to the axis of the drum of constant depth along their length which depth progressively increases in the direction of the center portion of said drum; a plurality of elongated electrically conductive strips, said strips being supported peripherally adjacent and longitudinally parallel to said drum, said strips and said drum forming a plurality of transmission lines; means for electrically coupling said source to each of said plurality of transmission lines; a plurality of groups of probes, each group of probes including a plurality of probes equispaced from one another in the direction of elongation of said drum and electrically coupled to a different one of said transmission lines and to respective radiators, whereby rotation of the center portion of said drum varies the length of the electric path between said plurality of probes relative to each other and to thereby vary the phase of the energy input into said plurality of radiators relative to each other.

11. An electromagnetic feed and phase shifting device for coupling an electromagnetic source to a plurality of radiators of one or more antenna arrays comprising: an elongated electrically conductive cylindrical drum, said drum including a rotatable center portion and two stationary end portions, the center portion of said drum having a plurality of identical annular corrugations lying in planes normal to the axis of the drum and varying in depth along their length, the end portions of said drum having a plurality of annular corrugations lying in planes normal to the axis of the drum of constant depth along their length, transition regions proximate to the end of and included in the center portion of said drum wherein the depth of corrugations progressively changes from the variable depth of the center portion to the constant depth of the end portions of said drum, four elongated electrically conductive strips, said strips being supported peripherally adjacent and longitudinally parallel to said drum, said strips being equiangularly distributed around the periphery of said drum, said strips and said drum forming four transmission lines; means for electrically coupling said source to the sections of each of said transmission lines coextensive with one end portion of said drum; four groups of probes, each group of probes including a plurality of probes equispaced from one another in the direction of elongation of said drum and electrically coupled to a different one of said transmission lines at the section substantially coextensive with the center portion of the said drum and to respective radiators; and means for rotating the center portion of said drum, whereby rotation of the center portion of said drum varies in the length of the electric path between said plurality of probes relative to each other and to thereby vary the phase of the energy input into said plurality of radiators relative to each other.

12. An electromagnetic feed and phase shifting device for coupling an electromagnetic source to a plurality of radiators of one or more antenna arrays comprising: an elongated electrically conductive cylindrical drum, said drum including a rotatable center portion and two stationary end portions, the center portion of said drum having a plurality of identical annular corrugations lying in planes normal to the axis of the drum and varying in depth along their length, the end portions of said drum having a plurality of annular corrugations lying in planes normal to the axis of the drum of constant depth along their length, transition regions proximate to the end of and included in the center portion of said drum wherein the depth of corrugations progressively changes from the variable depth of the center portion to the constant depth of the end portions of said drum, four elongated electrically conductive strips, said strips being supported peripherally adjacent and longitudinally parallel to said drum, said strips being equiangularly distributed around the periphery of said drum, said strips and said drum forming four transmission lines; means for electrically coupling said source to the sections of each of said transmission lines coextensive with one end portion of said drum; four groups of probes, each group of probes including a plurality of probes equispaced from one another in the direction of elongation of said drum and electrically coupled to a different one of said transmission lines at the section substantially coextensive with the center portion of the said drum and to respective radiators, said probes having an inner and an outer conductor, the coupling between said probe and said transmission line including a low resistive electrical coupling between the outer conductor of said probe and said strip and a high capacitive electrical coupling between the inner conductor of said probe and the corrugated surface of the center portion of said drum; and means for rotating the center portion of said drum, whereby rotation of the center portion of said drum varies in the length of the electric path between said plurality of probes relative to each other and to thereby vary the phase of the energy input into said plurality of radiators relative to each other.

13. An electromagnetic feed and phase shifting device for coupling an electromagnetic source to a plurality of radiators of one or more arrays comprising: a rotatable circular disc having an electrically conductive surface, said disc including a plurality of annular corrugations in said conductive surfaces concentric with said disc varying in depth along their length; at least one elongated electrically conductive strip, said strip being supported adjacent and parallel to said disc with its direction of elongation in a radial plane, said strips and a portion of said disc forming a transmission line; means for electrically coupling said source to said transmission line; a plurality of probes equispaced from one another in the direction of elongation of said strip and electrically coupled to said transmission line and to respective radiators; and means for rotating said disc about its axis, whereby rotation of the disc varies the length of the electrical path between said plurality of probes relative to each other and to thereby vary the phase of the energy input into said plurality of said radiators relative to each other.

References Cited in the file of this patent

UNITED STATES PATENTS

| | | |
|---|---|---|
| 2,453,414 | De Vore | Nov. 9, 1948 |
| 2,742,642 | Clapp | Apr. 17, 1956 |
| 2,749,524 | Derosa et al. | June 5, 1956 |